United States Patent [19]

Lawson et al.

[11] Patent Number: 5,346,009
[45] Date of Patent: Sep. 13, 1994

[54] PRECIPITATION OF SCALE INHIBITORS

[75] Inventors: Jimmie B. Lawson; Robert J. Faircloth; George N. Iken, all of Houston, Tex.

[73] Assignee: Shell Oil Company, Houston, Tex.

[21] Appl. No.: 14,585

[22] Filed: Feb. 8, 1993

[51] Int. Cl.$^5$ .................. E21B 43/12; E21B 43/22
[52] U.S. Cl. .................. 166/279; 166/300; 252/8.552
[58] Field of Search .................. 166/279, 310, 300; 252/8.552

[56] References Cited

U.S. PATENT DOCUMENTS

| | | | |
|---|---|---|---|
| 3,483,925 | 12/1969 | Slyker | 166/279 |
| 3,633,672 | 1/1972 | Smith et al. | 166/279 |
| 3,654,993 | 4/1972 | Smith et al. | 166/279 |
| 3,704,750 | 12/1972 | Miles et al. | 166/279 |
| 4,357,248 | 11/1982 | Berkshire et al. | 166/279 X |
| 4,393,938 | 7/1983 | Lawson et al. | 166/279 |
| 4,860,829 | 8/1989 | Carlberg et al. | 166/279 |
| 4,947,934 | 8/1990 | Hen | 166/279 |
| 5,002,126 | 3/1991 | Carlberg et al. | 166/279 |
| 5,141,655 | 8/1992 | Hen | 252/8.552 |
| 5,211,237 | 5/1993 | Faircloth et al. | 166/279 |

*Primary Examiner*—George A. Suchfield
*Attorney, Agent, or Firm*—Del S. Christensen

[57] ABSTRACT

A method to place anionic scale inhibitors in formations containing $CaSO_4$ is provided. The solution dissolves $CaSO_4$ when injected into the formation containing $CaSO_4$ causing calcium salts of the scale inhibitor to precipitate at a rate and to an extent that exceeds that resulting when an inhibitor solution not containing the salt is used. Precipitation of the calcium salt of scale inhibitor is maximized because salt reduces its solubility.

9 Claims, No Drawings

PRECIPITATION OF SCALE INHIBITORS

FIELD OF THE INVENTION

This invention relates to a method to place scale inhibitors within a subterranean formation.

BACKGROUND OF THE INVENTION

Slightly soluble inorganic salts, for example calcium carbonate, calcium sulfate, and barium sulfate, often precipitate from waters produced along with oil and gas. Such precipitation occurs because conditions that affect solubility, such as temperature and pressure, change in, or near, producing wellbores. Additionally, incompatible waters can mix with formation waters in or near the wellbore. Precipitates of slightly soluble salts are often called scale. Scale build-up occurs both within the near wellbore formation and within the wellbore equipment. Scale buildup within the formation decreases permeability and impairs well productivity. Scale build-up within wellbore equipment shortens equipment useful life and can plug production tubing.

To minimize scaling, scale inhibitors can be placed within the formation by "squeeze" methods. Squeezing involves injecting the inhibitor and, usually, overflushing the treated zone with water or brine. The well is then placed back into production. Inhibitor in the produced waters protects the wellbore and downhole equipment from scale build-up.

Squeezing inhibitor into the formation is a convenient way to apply an inhibitor. Continuous injection is not and the formation in the vicinity of the wellbore along with the wellbore equipment is protected. Most common scale inhibitors are effective in concentrations greater than about 1 to 100 parts million. In a normal squeeze placement, it is difficult to control the concentration of inhibitor returning in produced brines. The inhibitors tend to be produced quickly, with concentrations quickly tailing off to ineffective amounts. This results in frequent shutdowns of production for squeezing operations, and also in excessive chemical costs.

Various attempts to control and delay inhibitor production have been only partially successful. For example, U.S. Pat. No. 3,483,925 discloses a method to provide a more gradual return of inhibitor by injection of the inhibitor with polymer-thickened slugs of solution. Injection of such thickened solutions would inhibit production of all fluids from the wellbore, and is therefore not a desirable method to provide a more gradual return of the inhibitor when production from the wellbore is desired.

U.S. Pat. Nos. 3,633,672 and 3,704,750 disclose inhibitors which are only slightly soluble in neutral or basic solutions and soluble in acidic solutions. These inhibitors are squeezed into the formation in an acidic solution, and then dilution with formation brine and reaction with reservoir rock raises the solution pH and causes precipitation of the inhibitor. The inhibitor is then produced gradually due to a slight solubility in the brine. This method solves many of the problems with squeeze placement of scale inhibitors, but due to plug flow into the formation and then back with production, much of the inhibitor is not precipitated into the formation within a reasonable amount of time. Further, placement of the precipitate is poorly controlled and not predictable.

U.S. Pat. No. 4,357,248 discloses an improvement to processes such as those disclosed in U.S. Pat. Nos. 3,633,672 and 3,704,750. Patent '248 discloses injection of a scale inhibitor in a form which is soluble in a high pH aqueous solution and insoluble in neutral or low pH solutions. The solution further comprises a compound that hydrolyzes to form acidic compounds at a rate which causes the inhibitor to precipitate in the formation without the need for mixing with formation brines or reaction with formation rocks. This method, in spite of its advantages, has not been widely practiced because of difficulty in handling the useful pH lowering materials.

U. S. Pat. No. 5,141,655 and application Ser. No. 829,185 disclose an alternative to injecting pH lowering compounds to cause scale inhibitors to precipitate. These patents disclose the inclusion of pH raising compounds and starting with an initial scale inhibitor solution that is of a low pH. Typical scale inhibitors are soluble at low and high pH's, and are less soluble over a pH range of about 3 to 6. Although the low pH inhibitor solutions are easier to handle, they must still be blended with the pH adjusting compounds at the time of injection.

It is therefore an object of the present invention to provide a method to place a scale inhibitor into a subterranean formation and composition suitable for such a method wherein the formation comprises $CaSO_4$, the scale inhibitor is soluble in the solution prior to contact with the subterranean formation, and the solution does not require mixing at the wellhead prior to injection. It is a further object to provide such a method and composition wherein reactive chemicals are not required for wellhead preparation of such a composition.

SUMMARY OF THE INVENTION

These and other objects are accomplished by a method to reduce scale deposition in an aqueous phase producing wellbore and surrounding formation, wherein the formation comprises $CaSO_4$, the method comprising the steps of:

a) providing a solution comprising an anionic scale inhibitor and a salt having a monovalent cation in a concentration effective to at least about double the solubility of calcium sulfate compared to a scale inhibitor solution in the absence of the salt having a monovalent cation;

b) injecting the solution into the formation;

c) precipitating a portion of the anionic scale inhibitor in the formation as a calcium salt of the anionic scale inhibitor; and d) producing the aqueous phase from the wellbore.

The anionic scale inhibitor of the present invention is soluble in the solution containing the salt and the inhibitor. But after injection into a $CaSO_4$ containing formation, calcium will be dissolved into the solution and cause the anionic scale inhibitor to precipitate. A sodium chloride content of twelve to fourteen percent by weight decreases the solubility of calcium salts of scale inhibitors such as diethylenetriaminepenta(methylene phosphonic acid) to about one eighth of the solubility without sodium chloride. This amount of sodium chloride also increases the solubility of $CaSO_4$ in the solution from about 0.21 to about 0.72 percent by weight. The amount of scale inhibitor retained during a squeeze is often limited by the quantities of inhibitor adsorbed on the formation and the solubility of the calcium salt of the inhibitor in the squeezed solution. The present invention, by significantly increasing the amount of scale inhibitor that precipitates from the squeeze solution, permits significantly longer runs between shutdowns to perform squeeze injections for placement of the scale inhibitor. The time required to precipitate a significant portion of the scale inhibitor is also considerably reduced by the inclusion in the injection solution of the salt of the present invention.

Preferred anionic scale inhibitors include nitrogen containing phosphonate scale inhibiting compounds such as nitrilotri(methylene phosphonic acid), and diethylenetriaminepenta(methylene phosphonic acid). The preferred salt is sodium chloride due to its availability and low cost.

DETAILED DESCRIPTION OF THE INVENTION

Anionic scale inhibitors that are useful in the present invention include, but are not limited to, anionic scale inhibitors such as polycarboxylates and organophosphorus type scale inhibitors. Multivalent metal salts of these inhibitors have low solubilities whereas these inhibitors are considerably more soluble in the acid form or as salts with monovalent cations. Preferred anionic inhibitors include phosphate and phosphonate scale inhibitors. Particularly preferred inhibitors include nitrogen-containing phosphonate scale inhibiting compounds such as nitrilotri(methylene phosphonic acid) and diethylene-triaminepenta(methylene phosphonic acid). These inhibitors are available from Monsanto Chemical Company under the trade names "DEQUEST®2000"and "DEQUEST®060". Other suitable inhibitors include "DEQUEST®" 2010, 2041, 2051 and 2054, also available from Monsanto Chemical Company. Typically, such organophosphorus scale inhibitors are incorporated in the salt inhibition solution of the present invention in concentrations of between about 0.25% and about 10%. The concentration is preferably between about 1% and about 2%.

Salts of monovalent cations tend to enhance solubility of $CaSO_4$. This enhanced solubility results in higher concentrations of calcium ions in the solution, which in turn results in calcium salts of the scale inhibitor precipitating. The salt having a monovalent cation preferably is present in a type and amount that doubles the solubility of calcium sulfate ($CaSO_4$) in the inhibitor solution compared to the inhibition solution without the salt. More preferably, the type and amount of salt will triple the solubility. Sodium chloride in concentrations of about 12 to about 20 percent by weight of the solution will increase the solubility of calcium sulfate from about 0.21 to over 0.7 percent weight of the solution. Sodium chloride is preferred because of its effectiveness, availability and low cost. Concentrations of about 5 to about 20 percent by weight are preferred and about 12 to about 14 percent by weight of sodium chloride are most preferred.

Other acceptable salts having monovalent cations along with preferred concentrations include ammonium acetate at 12–18% wt, ammonium chloride at 16–22% wt, ammonium nitrate at 6–10% wt, and potassium chloride at 5–9% wt.

In the practice of the present invention, calcium required to precipitate the scale inhibitor within the formation originates within the formation. The formation must therefore comprise calcium in a form such as calcium sulfate (CaSO4). Calcium sulfate can be present within formations in the form of anhydrite, or gypsum. Dolomite containing reservoirs typically contain significant quantities of calcium sulfate. In order for sufficient calcium to be available to be dissolved by the salt inhibitor solution and in turn to be precipitated with the inhibitor only a small portion of the formation needs to be calcium sulfate. Greater than about 0.5 percent by weight of the formation rock is preferably $CaSO_4$, and between about 3% and about 40% is more preferably $CaSO_4$ in order to ensure that ample calcium ions are available for dissolution.

The formations to be treated with the scale inhibitor of the present invention generally co-produce formation brine with hydrocarbon oils and/or gases. The formation brine is both the solvent for the scale components and a solvent for low concentrations of scale inhibitor after production resumes. The scale inhibitor is sufficiently soluble in formation brine at formation temperatures to be effective as a scale inhibitor.

The salt inhibitor solutions of the present invention are preferably pushed into formations by overflushing. Overflushing is injection of another fluid after the scale inhibitor solution. This clears the scale inhibitor out of the wellbore and into the formation. The overflush fluids may optionally comprise polymeric thickeners. The overflush fluids may be formation brines, or any liquids compatible with the formation and compatible with the salt inhibitor being flushed into the formations. The overflush, or at least an initial portion of the overflush, preferably comprises salts to increase precipitation of the scale inhibitor at the interface between the salt-inhibitor solution and the overflush liquids.

After squeezing the salt-inhibitor solution into the formation, and optionally overflushing, injection may be discontinued for a time period sufficient for precipitation of divalent salts of the inhibitor. During this delay, fluids are preferably neither produced nor injected. The precipitation of the metal salt of the inhibitor does not require a complete cessation of injection. Injection of overflush may continue through a portion of the time period for the precipitation of the scale inhibitor. Precipitation of an effective amount of the scale inhibitor may be accomplished by ceasing injection and allowing the injected inhibitor/salt solution of the present invention to soak for a time period between about 0.5 and about 2 days. The soak time period may very depending in the rate that the formation calcium sulfate goes into solution. Usually 1 to 2 days is preferred.

EXAMPLE

Percent of precipitation of calcium diethylenetriaminepenta-(methylene phosphonic acid) (DETAPMP) from a 1 percent solution of DETAPMP after time periods of one day to ten days appears in Table 1. Both the rate of precipitation and the ultimate extent of precipitation are enhanced by adding salt to the solution. With the salt present, greater than about 70% of the scale inhibitor precipitated within a reasonable time period. The salt-inhibitor solutions were contacted with solid $CaSO_4$ at a temperature of 73° to 75° F. during this time period. Inhibitor precipitated to a greater extent and more quickly with salt present in the solution.

Experiments were also conducted using crushed dolomite reservoir rock from a West Texas reservoir rock. Salt solutions containing approximately 0.5 wt percent of the scale inhibitor DETAPMP were aged with crushed reservoir rock for 10 days. Two salt solutions were used. One contained 0.26 wt percent sodium chloride and one contained 14.79 wt percent sodium chloride. Weight ratio of liquid to solid rock was 4:1. Solutions were at room temperature. At the end of 10 days, only about 60 percent of the DETAPMP had precipitated from the 0.26 wt percent salt solution. However, 99 percent of the DETAPMP had precipitated from the solution containing 14.79 wt percent salt.

These experiments indicate that adding salt to inhibitor squeeze solutions will increase the retention of scale inhibitors and increase squeeze lifetimes.

TABLE 1

Percent of DETAPMP Precipitated from Salt Solutions in the Presence of Anhydrite/percent wt NaCl

| Time | Percent by weight NaCl | | | |
|---|---|---|---|---|
| (days) | 0.26 | 5.5 | 14.86 | 24.5 |
| 1 | 13 | 4 | 5 | 9 |
| 2 | 20 | 13 | 23 | 23 |
| 3 | 32 | 23 | 54 | 42 |
| 4 | 48 | 28 | 64 | 56 |
| 7 | 53 | 57 | 74 | 66 |
| 10 | 61 | 70 | 78 | 72 |

We claim:

1. A method to reduce scale deposition in an aqueous phase producing wellbore and surrounding formation, wherein the formation comprises $CaSO_4$, the method comprising the steps of:
   a) providing a solution comprising an anionic scale inhibitor and a salt having a monovalent cation in a concentration effective to at least about double the solubility of calcium sulfate compared to a scale inhibitor solution in the absence of the salt having a monovalent cation;
   b) injecting the solution into the formation;
   c) precipitating a portion of the anionic scale inhibitor in the formation as a calcium salt of the anionic scale inhibitor; and
   d) producing the aqueous phase from the wellbore.

2. The method of claim 1 wherein the anionic scale inhibitor is selected from the group consisting of phosphates, phosphonate, organophosphorus and polycarboxylates.

3. The method of claim 2 wherein the anionic scale inhibitor is selected from the group consisting of nitrilotri (methylene phosphonic acid), diethylenetriaminepenta (methylene phosphonic acid), and salts thereof.

4. The method of claim 3 wherein the anionic scale inhibitor is present in the solution in a concentration between about 0.25 and about 10 percent by weight of the solution.

5. The method of claim 3 wherein the salt having a monovalent cation is sodium chloride, and the sodium chloride is present in an amount between 5 and about 20 weight percent of the solution.

6. The method of claim 5 wherein the anionic scale inhibitor is present in the solution in a concentration between about 0.25 and about 10.

7. The method of claim 6 wherein greater than about seventy percent of the anionic scale inhibitor in the solution is precipitated in the formation.

8. The method of claim 1 wherein the salt having a monovalent cation is selected from the group consisting of sodium chloride, potassium chloride, ammonium acetate, ammonium chloride, and ammonium nitrate.

9. The method of claim 1 wherein the type and amount of the salt having a monovalent cation cause the solubility of calcium sulfate to be at least three times the solubility of calcium sulfate in the solution without the salt.

* * * * *